United States Patent
Ray et al.

(10) Patent No.: US 11,002,010 B2
(45) Date of Patent: May 11, 2021

(54) METHODS FOR MAKING HIGH SOUND TRANSMISSION CLASS GYPSUM BOARDS AND GYPSUM BOARDS MADE BY THE METHOD

(71) Applicant: United States Gypsum Company, Chicago, IL (US)

(72) Inventors: Suman Sinha Ray, Chicago, IL (US); Mark Antosh, Arlington Heights, IL (US); Mark Hemphill, Hawthorn Woods, IL (US); Yijun Sang, Oak Park, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 0 days.

(21) Appl. No.: 16/356,303

(22) Filed: Mar. 18, 2019

(65) Prior Publication Data

US 2019/0338516 A1    Nov. 7, 2019

Related U.S. Application Data

(60) Provisional application No. 62/665,341, filed on May 1, 2018, provisional application No. 62/795,315, filed on Jan. 22, 2019.

(51) Int. Cl.
*E04C 2/04* (2006.01)
*B32B 7/12* (2006.01)
(Continued)

(52) U.S. Cl.
CPC ............... *E04C 2/043* (2013.01); *B32B 7/12* (2013.01); *B32B 13/04* (2013.01); *B32B 37/24* (2013.01);
(Continued)

(58) Field of Classification Search
CPC ... E04C 2/043; E04C 2/46; B32B 7/12; B32B 13/04; B32B 13/12; B32B 13/08;
(Continued)

(56) References Cited

U.S. PATENT DOCUMENTS

| 1,769,519 A | 7/1930 | King et al. |
| 2,179,339 A | 11/1939 | Little et al. |

(Continued)

FOREIGN PATENT DOCUMENTS

| EP | 2142719 | 1/2010 |
| WO | 2008124672 A1 | 10/2008 |

(Continued)

OTHER PUBLICATIONS

Durock Tile Membrance Adhesive, Submittal Sheet 09300, United States Gypsum Company, Chicago IL USA.

(Continued)

*Primary Examiner* — Jasper Saberi
(74) *Attorney, Agent, or Firm* — Vorys, Sater Seymour and Pease LLP; Pradip Sahu; Philip T. Petti

(57) ABSTRACT

A layered gypsum wallboard can include: a gypsum board having opposing front and back faces, wherein the gypsum board comprises a first cover sheet material at the front face, a second cover sheet material at the back face, and a gypsum core layer comprising gypsum; an adhesive layer on the second cover sheet material of the gypsum board, the adhesive including a polymer having a glass transition temperature ($T_g$) of −10° C. to 30° C.; an intermediate gypsum layer including gypsum on the adhesive layer such that the adhesive layer is between the second cover sheet material and the intermediate gypsum layer, wherein the adhesive layer and the intermediate gypsum layer have a combined thickness of 0.09 inches to 0.25 inches; and a third cover sheet material, wherein the intermediate gypsum layer (Continued)

is between and in contact with the adhesive layer and the third cover sheet material.

20 Claims, 6 Drawing Sheets

(51) Int. Cl.
| | |
|---|---|
| *B32B 13/04* | (2006.01) |
| *B32B 37/24* | (2006.01) |
| *E04B 2/72* | (2006.01) |
| *E04B 2/00* | (2006.01) |
| *E04B 1/84* | (2006.01) |
| *E04B 1/86* | (2006.01) |
| *G10K 11/168* | (2006.01) |
| *E04B 1/82* | (2006.01) |
| *B32B 13/08* | (2006.01) |
| *B32B 13/12* | (2006.01) |
| *E04B 1/74* | (2006.01) |

(52) U.S. Cl.
CPC .......... *E04B 1/8409* (2013.01); *E04B 2/723* (2013.01); *E04C 2/46* (2013.01); *B32B 13/08* (2013.01); *B32B 13/12* (2013.01); *B32B 2037/243* (2013.01); *B32B 2255/26* (2013.01); *B32B 2307/10* (2013.01); *B32B 2307/102* (2013.01); *B32B 2419/00* (2013.01); *B32B 2607/00* (2013.01); *E04B 1/74* (2013.01); *E04B 1/82* (2013.01); *E04B 1/86* (2013.01); *E04B 2001/8263* (2013.01); *G10K 11/168* (2013.01)

(58) Field of Classification Search
CPC .......... B32B 2307/10; B32B 2307/102; B32B 2607/00; E04B 1/86; E04B 1/8409; E04B 1/82; E04B 2/723; E04B 1/74; E04B 2/72; G10K 11/168
See application file for complete search history.

(56) References Cited

U.S. PATENT DOCUMENTS

| | | | |
|---|---|---|---|
| 4,022,728 A * | 5/1977 | Trotter | .................. C09J 123/12 |
| | | | 524/528 |
| 4,460,720 A | 7/1984 | Gaidis et al. | |
| 4,663,224 A | 5/1987 | Tabata et al. | |
| 4,853,085 A | 8/1989 | Johnstone et al. | |
| 5,643,510 A | 7/1997 | Sucech | |
| 5,683,635 A | 11/1997 | Sucech et al. | |
| 5,718,759 A | 2/1998 | Stav et al. | |
| 6,494,609 B1 | 12/2002 | Wittbold et al. | |
| 6,874,930 B2 | 4/2005 | Wittbold et al. | |
| 7,007,914 B2 | 3/2006 | Petersen et al. | |
| 7,181,891 B2 | 2/2007 | Surace et al. | |
| 7,296,919 B2 | 11/2007 | Petersen et al. | |
| 7,399,800 B2 | 7/2008 | Burch | |
| 7,767,019 B2 | 8/2010 | Liu et al. | |
| 7,799,410 B2 | 9/2010 | Tinianov | |
| 8,197,952 B2 | 6/2012 | Yu et al. | |
| 8,495,851 B2 | 7/2013 | Surace et al. | |
| 8,627,922 B2 | 1/2014 | Fournier et al. | |
| 8,739,927 B2 | 6/2014 | Kang et al. | |
| 9,512,613 B2 | 12/2016 | Blades et al. | |
| 9,903,116 B2 | 2/2018 | Ray | |
| 9,909,304 B2 | 3/2018 | Blades et al. | |
| 9,945,119 B2 | 4/2018 | Aldabaibeh et al. | |
| 10,125,492 B2 | 11/2018 | Tinianov | |
| 2002/0017222 A1 * | 2/2002 | Luongo | .................. C04B 14/185 |
| | | | 106/611 |
| 2004/0038065 A1 * | 2/2004 | Francis | .................... C04B 28/14 |
| | | | 428/537.7 |
| 2006/0235121 A1 * | 10/2006 | Burch | .................... C08K 5/101 |
| | | | 524/270 |
| 2007/0227814 A1 | 10/2007 | Schabel, Jr. | |
| 2008/0245603 A1 * | 10/2008 | Tinianov | .................. E04B 1/86 |
| | | | 181/207 |
| 2008/0299413 A1 * | 12/2008 | Song | .................. B28B 19/0092 |
| | | | 428/689 |
| 2010/0143682 A1 | 6/2010 | Shake et al. | |
| 2011/0296794 A1 * | 12/2011 | Thomas | .................... E04B 1/86 |
| | | | 52/784.11 |
| 2012/0021215 A1 | 1/2012 | Burch | |
| 2014/0113124 A1 * | 4/2014 | Sang | ........................ E04C 2/26 |
| | | | 428/220 |
| 2015/0018470 A1 * | 1/2015 | Nakatani | ............. C08L 23/0815 |
| | | | 524/274 |
| 2016/0230395 A1 * | 8/2016 | Cusa | .......................... E04B 1/86 |
| 2017/0081842 A1 * | 3/2017 | Ray | ........................... E04C 2/24 |

FOREIGN PATENT DOCUMENTS

| | | |
|---|---|---|
| WO | 2010103322 A2 | 9/2010 |
| WO | 2016127127 A1 | 8/2016 |
| WO | 2017053110 A1 | 3/2017 |

OTHER PUBLICATIONS

P.A. Steward et al., An overview of polymer latex film formation and properties, Advances in Colloid and Interface Science 86 (2000) pp. 195-267.
International Search Report and Written Opinion dated Jun. 26, 2019 for PCT/US2019/029853 to United States Gypsum Company filed Apr. 30, 2019.

* cited by examiner

METHODS FOR MAKING HIGH SOUND TRANSMISSION CLASS GYPSUM BOARDS AND GYPSUM BOARDS MADE BY THE METHOD

CROSS-REFERENCE TO RELATED APPLICATIONS

This claims the benefit of U.S. provisional patent application No. 62/665,341, filed May 1, 2018, and U.S. provisional patent application No. 62/795,315, filed Jan. 22, 2019, each incorporated herein by reference.

FIELD OF THE INVENTION

This invention relates to a method and composition for preparing set gypsum-containing products (e.g., gypsum boards) and methods for producing them. More particularly, the invention concerns such set gypsum-containing products having a high sound transmission class.

BACKGROUND

Often used in construction of interior walls is a gypsum board faced with paper. Typically, this board (also referred to as wallboard or drywall) is made by preparing a slurry comprising calcined gypsum, water, and other components. The gypsum slurry is then sandwiched between two sheets of paper, forming a gypsum core between two paper cover sheets. The gypsum core is then allowed to set. U.S. Pat. Nos. 8,197,952; 4,853,085; and 1,769,519 assigned to United States Gypsum Company, provide gypsum wallboard and methods of making it.

One of the requirements for gypsum wallboard is to provide an acoustic barrier between two adjacent rooms, including in multi-unit dwellings such as apartment buildings and hotels, and dwellings located next to a commercial building or an airport.

As wallboards differ in their compositions, so does their ability to provide an acoustical barrier. Accordingly, wallboards are classified based to their ability to diminish (dampen) sound transmission through a wall. This wallboard characteristic is known as Sound Transmission Class (STC), which can be measured for each wallboard according to ASTM E90-09(2016) "Standard Test Method Laboratory Measurement of Airborne Sound Transmission Loss of Building Partitions and Elements." The single number rating scheme STC is derived from the measured Sound Transmission Loss from 125 to 4000 Hz one-third octave bands.

The STC single number rating is calculated according to ASTM E413-16 "Classification for Sound Insulation" for a particular wallboard structure by fitting the reference contour defined in ASTM E413-16 to the measured Transmission Loss (TL) or Normalized Attenuation (Dn, c) data until the sum of deficiencies of the data compared to the reference value does not exceed 32 dB and the maximum deficiency at any one frequency does not exceed 8 dB. The single number rating is given by the value of the shifted reference contour at 500 Hz. For example, FIG. 1 illustrates a single rating STC 48 reference contour with overlaid measured data from a typical gypsum wallboard. Deviations of the measured data from the reference contour are deficiencies in the acoustic dampening of the gypsum wallboard.

The higher the STC value of a particular wallboard, the better this wallboard is at absorbing noise. Building construction codes may require wallboard with a certain minimum STC value for each particular application.

One strategy for obtaining a wallboard with a high STC value is to produce wallboard with a dense gypsum core (very heavy drywall). While this method may improve the acoustical properties of wallboard, it also produces wallboard that is heavy. Lighter wallboard would be a better solution for improved job site efficiency, among other reasons.

Another strategy is to laminate two gypsum boards together. U.S. Pat. No. 7,799,410 discloses a laminated panel in which two different layers are glued together. However, in addition to the doubled weight of the wallboard, laminated boards are extremely difficult to process for scoring, which may result in lower productivity and decreased job site efficiency.

It would be advantageous to have a method by which the same basic wallboard can be customized for different purposes with respect to sound absorption. There is a continuing need for new and improved set gypsum-containing products, and compositions and methods for producing them that solve, avoid, or minimize the problems noted above.

SUMMARY OF THE INVENTION

The invention provides a layered wallboard comprising:

a gypsum board having opposing front and back faces, wherein the gypsum board comprises a first cover sheet material at the front face, a second cover sheet material at the back face, and a gypsum core layer comprising gypsum, wherein the gypsum board has a thickness of 0.25 inches to 1.5 inches;

an adhesive layer on the second cover sheet material of the gypsum board, said adhesive comprising a polymer having a glass transition temperature ($T_g$) of −10° C. to 30° C.;

an intermediate gypsum layer comprising gypsum on the adhesive layer such that the adhesive layer is between the second cover sheet material and the intermediate gypsum layer, wherein the adhesive layer and the intermediate gypsum layer have a combined thickness of 0.09 inches to 0.25 inches; and a third cover sheet material, wherein the intermediate gypsum layer is between and in contact with the adhesive layer and the third cover sheet material.

The invention also provides a method comprising:

applying an adhesive coating having a thickness of 0.02 inches to 0.06 inches on a back face of a gypsum board having opposing front and back faces, said adhesive comprising a polymer having a glass transition temperature ($T_g$) of −10° C. to about 30° C., wherein the gypsum board comprises a first cover sheet material at the front face, a second cover sheet material at the back face, and a gypsum core layer comprising gypsum, wherein the gypsum board has a thickness of 0.25 inches to 1.5 inches;

applying an intermediate gypsum slurry comprising calcium sulfate hemihydrate on the adhesive coating to form an intermediate gypsum layer, wherein the adhesive coating and the gypsum slurry have a combined thickness of 0.09 inches to 0.25 inches; and applying a third cover sheet material on the intermediate gypsum slurry; and allowing the calcium sulfate hemihydrate of the gypsum slurry to set to form a layered wallboard.

The invention also provides a method comprising:

optionally applying a skim layer slurry to a first cover sheet material, the skim layer slurry comprising water and calcium sulfate hemihydrate;

applying a gypsum core slurry to either the first cover sheet material when the skim layer slurry is not present or the skim layer slurry when present, the gypsum core slurry comprising water and calcium sulfate hemihydrate;

applying a second cover sheet material about the gypsum core slurry, wherein a first side of the second cover sheet material faces toward the gypsum core slurry;

applying a polymer adhesive coating on a second side of the second cover sheet material opposed to the first side of the second cover sheet material, wherein the polymer adhesive comprises a polymer has a glass transition temperature ($T_g$) of −10° C. to about 30° C.;

applying an intermediate gypsum slurry onto the polymer adhesive coating, the intermediate gypsum slurry comprising water and calcium sulfate hemihydrate, wherein the polymer adhesive coating and the second gypsum slurry have a combined thickness of 0.09 inches to 0.25 inches; and applying a third cover sheet material on the intermediate gypsum slurry; and allowing the skim layer slurry, the gypsum core slurry, and the intermediate gypsum slurry to set to form a layered wallboard wherein a gypsum core layer resulting from the set gypsum core slurry has a thickness of 0.25 to 1.5 inches.

In the foregoing compositions and methods, the gypsum core slurry can be foamed and the corresponding gypsum core layer can have a total void volume of 30 to 90 volume percent. Alternatively, the gypsum core slurry may not be foamed and the corresponding gypsum core layer can have a total void volume of less than 30 volume percent.

In the foregoing compositions and methods, the intermediate gypsum slurry can be foamed and the corresponding intermediate gypsum layer can have a total void volume of 30 to 90 volume percent. Alternatively, the intermediate gypsum slurry may not be foamed and the corresponding intermediate gypsum layer can have a total void volume of less than 30 volume percent.

All percentages and ratios are by weight unless otherwise indicated. All molecular weights are weight average molecular weights unless otherwise indicated.

Example cover sheet materials include, but are not limited to, paper, cardboard, fiberglass, plastic, scrim or mesh facings, or any facing as is known in the art. Preferably, all three cover sheet materials in the inventive wallboard are paper.

DESCRIPTION OF PREFERRED EMBODIMENTS

Figure 1:
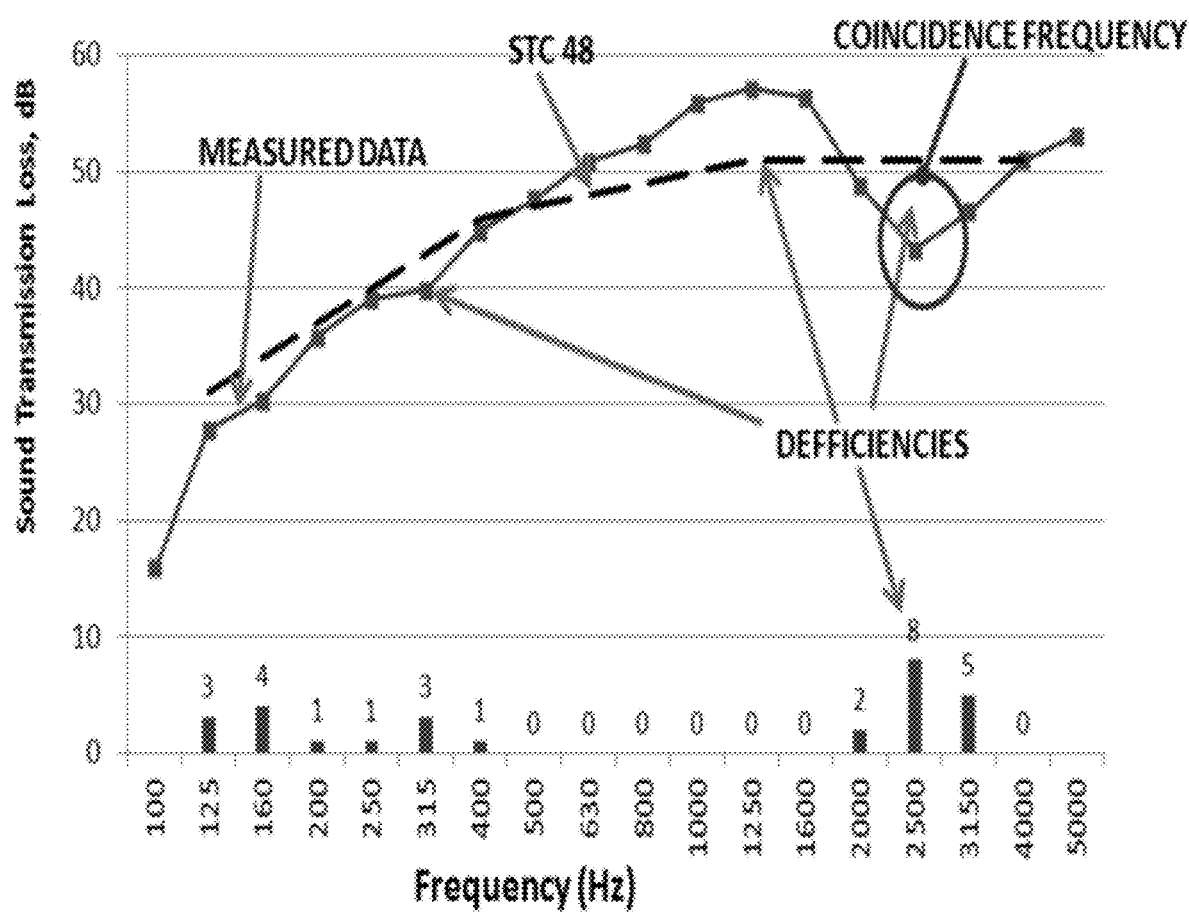
FIG. 1 illustrates a single rating STC 48 reference contour with overlaid measured data from a typical gypsum wallboard.
Figure 2:
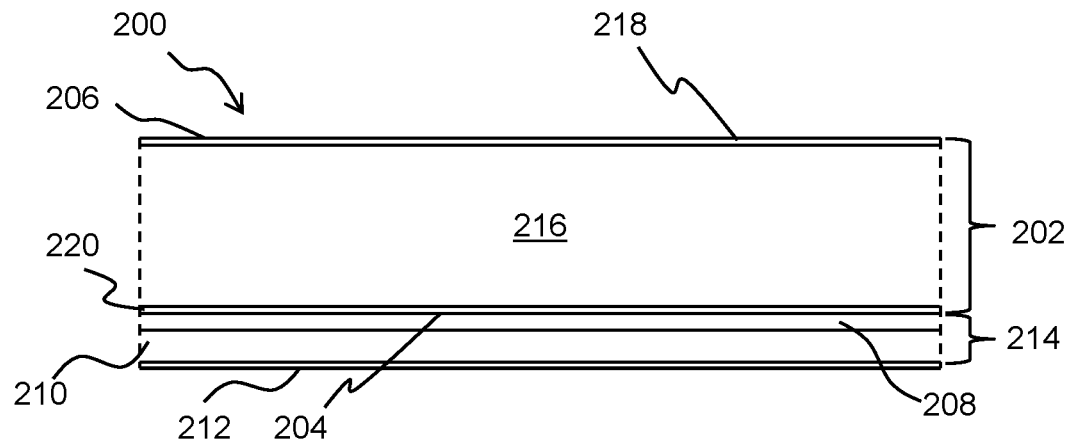
FIG. 2 illustrates an example wallboard configuration of the present invention.

The present invention relates to layered wallboards having a high sound transmission class (STC) and methods of preparing such layered wallboards. More specifically, FIG. 2 illustrates a first example configuration for a layered wallboard 200 of the present invention. The layered wallboard 200 includes a gypsum board 202 comprising a gypsum core 216 and first and second cover sheet materials 218, 220 on the opposing faces of the gypsum core. The surfaces of the first and second cover sheet materials 218, 220 define the opposing front face 206 and back face 204 of the gypsum board 202. A polymer adhesive layer 208 (also referred to herein as the adhesive layer) is on the back face 204 of the gypsum board 202. An intermediate gypsum layer 210 is on the adhesive layer 208 such that the polymer adhesive layer 208 is between the gypsum board 202 and the intermediate gypsum layer 210. Finally, a third cover sheet material 212 is on the intermediate gypsum layer 210 such that the intermediate gypsum layer 210 is between the polymer adhesive layer 208 and the third cover sheet material 212. The polymer adhesive layer 208 and the intermediate gypsum layer 210 have a combined thickness 214.

Figure 3:
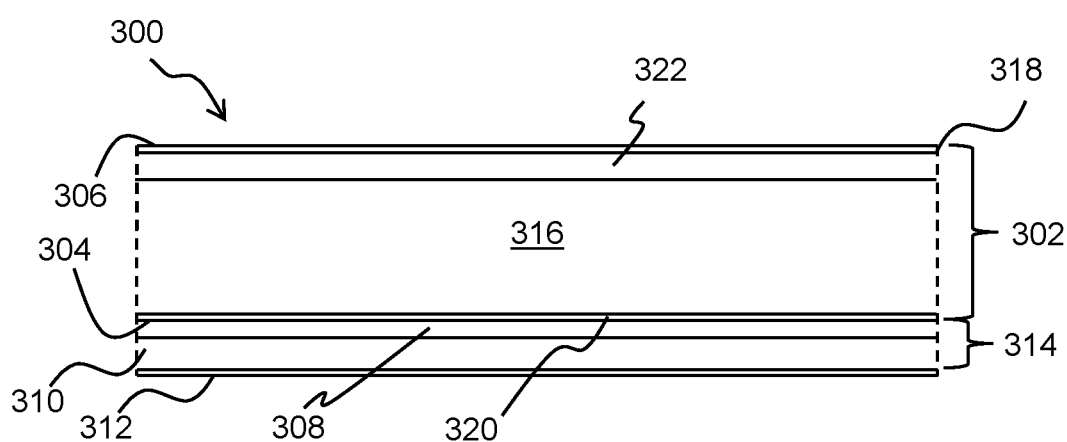
FIG. 3 illustrates another example wallboard configuration of the present invention.

FIG. 3 illustrates a second example configuration for a layered wallboard 300 of the present invention. The layered wallboard 300 includes a gypsum board 302 comprising a foamed gypsum core 316 adjacent a dense gypsum skim layer 322. First cover sheet material 318 is on the dense gypsum skim layer face not adjacent to the foamed gypsum core 316, and second cover sheet material 320 is on the gypsum core face not adjacent to the dense gypsum skim layer 322. The surfaces of the first and second cover sheet materials 318, 320 define the opposing back face 304 and front face 306 of the gypsum board 302. A polymer adhesive layer 308 is on the back face 304 of the gypsum board 302. An intermediate gypsum layer 310 is on the adhesive layer 308 such that the polymer adhesive layer 308 is between the gypsum board 302 and the intermediate gypsum layer 310. Finally, a third cover sheet material 312 is on the intermediate gypsum layer 310 such that the intermediate gypsum layer 310 is between the polymer adhesive layer 308 and the third cover sheet material 312. The polymer adhesive layer 308 and the intermediate gypsum layer 310 have a combined thickness 314.

Typically, the entire back face 204, 304 of the gypsum board 202, 302 is coated with the adhesive layer 208, 308. Typically, an entire surface of the intermediate gypsum layer 210, 310 is in contact with the adhesive layer 208, 308, and the entire opposing surface of the intermediate gypsum layer 210, 310 is in contact with the third cover sheet material 212, 312. Typically, the layered wallboard of the present invention has an absence of a metal layer.

Example cover sheet materials include, but are not limited to, paper, cardboard, fiberglass, plastic, scrim or mesh facings, or any facing as is known in the art. Preferably, all three cover sheet materials in the inventive wallboard are paper.

The inventive layered wallboards have a high STC (e.g., 45 or greater) at least in part because of the composition of the adhesive layer, the composition of the intermediate gypsum layer, and the combined thickness of these two layers. Without being limited by theory, sound moves through wallboard by bending and shearing according to EQS. 1 and 2.

$$c_b^4 = (D_p \omega^2 / M_p) \qquad \text{EQ. 1}$$

$$c_s^2 = (G_c / M_p) \qquad \text{EQ. 2}$$

where $c_b$ is the velocity of wave propagating by bending of wallboard, $c_s$ is the velocity of wave propagating by shearing of wallboard, $D_p$ is the bending stiffness of wallboard and is defined by $Eh^3/12(1-v^2)$, E is Young's modulus, h is the thickness of the wallboard, v is Poisson's ratio, ω is frequency, $M_p$ is mass of the wallboard/unit area, and $G_c$ is wallboard core shear modulus.

When installed, the layered wallboard faces outward such that the third cover sheet material adjacent the intermediate gypsum layer is against the stud. Without being limited by theory, the sound is first dampened by the gypsum in the gypsum board. However, the sound does travel relatively fast in the gypsum as compared to the adhesive layer. The low elastic properties of the polymer adhesive layer can drastically dampen the sound. Finally, the sound will reach the intermediate gypsum layer where gypsum causes the sound to bend and shear. Cumulatively, a sharp discontinuity in velocity of sound is created at the different layers, which further attenuates the sound waves. Because the dampening from the polymer adhesive layer and sound bending and shearing occur over a small distance (i.e., across the thickness of the layers), the sound is internally reflected within the two layers to further dissipate acoustic energy.

To achieve this dampening, the combined thickness of the adhesive layer and the intermediate gypsum layer is about 0.25 inches (in) or less (e.g., about 0.09 inches to about 0.25 inches, preferably about 0.1 inches to about 0.2 inches, and more preferably about 0.12 inches to about 0.15 inches). The adhesive layer has a thickness of about 0.02 inches to about 0.06 inches, preferably the adhesive layer has a thickness of about 0.02 inches to about 0.05 inches. The intermediate gypsum layer has a thickness of about 0.07 inches to about 0.23 inches, preferably the intermediate layer has a thickness of about 0.07 inches to about 0.19 inches.

The inventive layered wallboard itself can have an STC of about 50 or greater, preferably about 50 to about 70, preferably about 53 to about 65, and more preferably about 55 to about 60. When the layered wallboard is used at opposing sides of a wall, the acoustic dampening may be further enhanced and the wall can have an STC of about 55 or greater, preferably about 60 to about 80, and more preferably about 65 to about 75. STC determined using the measurements by ASTM E90-09(2016) and calculations of ASTM E413-16 using a 25 gauge equivalent steel stud, 24 inch on center screw spacing with a 3.5 inch glass fiber insulation, and having the inventive board will be on both sides of the stud assembly.

In addition to the sound dampening qualities, the inventive layered wallboard is advantageous significantly lighter than laminated wallboards because the gypsum layer is significantly thinner and lighter than the second wallboard used in laminated wallboards. For example, two 5/16 inch wallboards laminated together, yielding a total thickness of about 5/8 inch, may have a weight of about 2.6 lb/ft². In contrast, the inventive layered wallboard comprising a ½ inch gypsum wallboard having a foamed gypsum core and ⅛ inch combined adhesive layer and intermediate gypsum layer thickness can have a weight of about 1.6 lb/ft². As illustrated in the example, sound dampening properties can be achieved with the inventive layered wallboard almost a 40% reduction in weight.

Finally, laminated wallboards are difficult to produce and score. The layered wallboards of the present invention have straightforward manufacturing processes (described further herein) and can be scored by standard techniques.

Gypsum Board

As illustrated in FIGS. 2 and 3, gypsum boards for use in the present invention have gypsum material between two cover sheet materials (e.g., paper sheets). The gypsum material, as illustrated in FIG. 2, can be a single layer of gypsum or, as illustrated in FIG. 3, can be layers of gypsum.

The board is made using at least 60 wt % hemihydrate in addition to other additives, as are known in the art. When making the board the calcium sulfate of the slurry starts out as mostly in hem i-hydrate form, but then it turns into dihydrate form. Typical initial gypsum slurry formulations are made from blends shown in Table 1. In Table 1 any value in a column for a particular parameter may be combined with values for the other parameters from the same column or different columns. However, preferably any value in a column for a particular parameter is combined with the values for the other parameters from the same column.

TABLE 1

Gypsum slurry formulation for making the gypsum core, the dense gypsum skim layer, or the foamed gypsum core

| Slurry | Broad Range | Preferred Range | Most Preferred Range | Specific Example |
|---|---|---|---|---|
| Calcined calcium sulfate (calcium sulfate hemihydrate and optionally calcium sulfate anhydrite, but at least 60 wt % calcium sulfate hemihydrate in the calcined calcium sulfate) (wt % on a dry, water free, basis)* | 88 to 99.6 | 90 to 99.6 | 95 to 99.6 | 96.5 to 99.6 |
| Additives (wt % on a dry basis) | 0.4 to 12 | 0.4 to 10 | 0.4 to 5 | 0.4 to 3.5 |
| Weight ratio of the water to calcium sulfate hemihydrate in slurry | 1:6 to 1:1 | 0.2:1 to 0.8:1 | 0.4:1 to 0.7:1 | 2:3 |

*Dry basis means water free basis in the present specification. Wet basis means water inclusive basis in the present specification.

For the foamed gypsum core, the slurry formulation can be foamed to have 10 to 70 volume % air, preferably 20 to 60 volume % air. The resultant foamed gypsum core layer has 30 to 92 volume % voids, preferably 30 to 90 volume % voids.

The final respective gypsum compositions comprise the concentrations of components in Table 1 except that the calcined calcium sulfate has converted to calcium sulfate dihydrate.

The gypsum skim layer is often referred to as a skim coat as is known in the art. Also, optionally hard edges which are layers of relatively dense gypsum may be applied as is known in the art. Each skim layer and hard edge layer of relatively dense gypsum (if present) may have a thickness of about 1 to 10% of the total thickness of the gypsum core layer.

The gypsum boards can have any desired thickness. Preferably, the gypsum board is about 0.25 inches to about 1.5 inches thick, preferably 0.5 inches to about 1 inch thick, and more preferably about 0.5 inches to about 0.75 inches thick.

Producing Gypsum Boards

In a typical gypsum panel manufacturing process, gypsum board is produced by uniformly dispersing calcined gypsum (calcium sulfate hemihydrate, commonly referred to as "stucco") in water to form an aqueous calcined gypsum slurry (e.g., according to a formulation in Table 1). The aqueous calcined gypsum slurry is typically produced in a continuous manner by inserting stucco and water and other additives into a mixer which contains means for agitating the contents to form a uniform gypsum slurry.

The slurry is continuously directed toward and through a discharge outlet of the mixer and into a discharge conduit connected to the discharge outlet of the mixer. An aqueous foam can be combined with the aqueous calcined gypsum slurry in the mixer and/or in the discharge conduit to reduce slurry density. The stream of slurry passes through the discharge conduit from which it is continuously deposited onto a moving web of cover sheet material (the first of the two paper sheets) supported by a forming table.

The slurry is allowed to spread over the moving web as it advances along the forming table. A second web of cover sheet material (the second of the two paper sheets) is applied to cover the slurry and form a sandwich structure of a continuous gypsum board preform, which is subjected to forming, such as at a conventional forming station, to obtain a desired thickness.

The calcined gypsum reacts with the water in the gypsum board preform and sets as a conveyor moves the gypsum board preform down a manufacturing line. The gypsum board preform is cut into segments at a point along the line where the preform has set sufficiently. The segments are flipped over, dried (e.g., in a kiln) to drive off excess water, and processed to provide the final gypsum board product of desired dimensions.

Prior devices and methods for addressing the production of gypsum board are disclosed in commonly-assigned U.S. Pat. Nos. 5,683,635; 5,643,510; 6,494,609; 6,874,930; 7,007,914; and 7,296,919, incorporated by reference.

The resultant gypsum board can then have the adhesive layer, gypsum layer, and third cover sheet material (e.g., cover sheet material 212, 312 of FIGS. 2 and 3) applied thereto, described further herein, to produce the layered wallboards of the present invention. Alternatively, the continuous gypsum board preform can have the adhesive layer, gypsum layer, and third cover sheet material applied thereto before cutting, described further herein, to produce the layered wallboards of the present invention.

Calcined Gypsum

As used herein, the term, "calcined gypsum" is intended to mean alpha calcium sulfate hemihydrate, beta calcium sulfate hemihydrate, water-soluble calcium sulfate anhydrite, or mixtures of any or all thereof. The terms "set gypsum" and "hydrated gypsum" are intended to mean calcium sulfate dihydrate that has been transformed from the anhydrite or hemihydrate form to the dihydrate form. The water in the mixture reacts with the calcined gypsum to form set gypsum.

The calcined gypsum employed in the invention can be in the form and concentrations typically found useful in the corresponding embodiments of the prior art. It can be alpha calcium sulfate hemihydrate, beta calcium sulfate hemihydrate, water-soluble calcium sulfate anhydrite, or mixtures of any or all thereof, from natural or synthetic sources.

Water

Water is added to the slurry in any amount that makes a flowable slurry. The amount of water to be used varies greatly according to the application with which it is being used, the exact dispersant being used, the properties of the stucco, and the additives being used.

Water used to make the slurry should be as pure as practical for best control of the properties of both the slurry and the set plaster. Salts and organic compounds are well known to modify the set time of the slurry, varying widely from accelerators to set inhibitors. Some impurities lead to irregularities in the structure as the interlocking matrix of dihydrate crystals forms, reducing the strength of the set product. Product strength and consistency is thus enhanced by the use of water that is as contaminant-free as practical.

Additives

Other conventional additives can be employed in the practice of the invention in customary amounts to impart desirable properties and to facilitate manufacturing, such as, for example, aqueous foam, set accelerators, set retarders, recalcination inhibitors, binders, adhesives, secondary dispersing aids (other than the linear polycarboxylate dispersants), leveling or non-leveling agents, thickeners, bactericides, fungicides, pH adjusters, colorants, reinforcing materials, fire retardants, water repellants, fillers, and mixtures thereof.

Dispersants are known for use with gypsum to help fluidize the mixture of water and calcium sulfate hemihydrate so less water is needed to make flowable slurry. The slurries typically contain a dispersant such as polynaphthalene sulfonate. Polynaphthalene sulfonate dispersants are well known and relatively less expensive, but have limited efficacy. Polynaphthalene sulfonate has good compatibility with starch, foaming agents, and clays. A production process for polynaphthalene sulfonates includes the following reaction steps: sulfonation of naphthalene with sulfuric acid producing b-naphthalene-sulfonic acid, condensation of b-naphthalene sulfonic acid with formaldehyde producing polymethylene naphthalene sulfonic acid, and neutralization of polymethylene naphthalene sulfonic acid with sodium hydroxide or another hydroxide. Depending on reaction conditions products with different characteristics are obtained.

U.S. Pat. No. 4,460,720 to Gaidis et al discloses a superplasticizer cement admixture for Portland based compositions formed from a low molecular weight alkali metal polyacrylate in combination with an alkali metal or alkaline earth metal polynaphthalene sulfonate-formaldehyde or an alkali metal lignosulfonate or an alkaline earth metal lignosulfonate or mixtures thereof.

U.S. Pat. No. 5,718,759 discloses the addition of silicates to mixtures of beta-calcined gypsum and cement. In the examples, lignosulfates or naphthalene sulfonates are used as water-reducing agents. The addition of pozzolanic materials, including silicates, is credited with-reducing expansion due to the formation of ettringite. The composition is suggested for use in building materials, such as backer boards, floor underlayments, road patching materials, fire-stopping materials and fiberboard.

U.S. Pat. No. 7,767,019 to Liu et al discloses embodiments of branched polycarboxylates for use as dispersants.

Adhesive Layer

The adhesive layer used in the layered wallboards of the present invention comprises a polymer such as a binder. The adhesive layer is disposed on all or substantially all, for example at least 90%, of the back face of the gypsum board (e.g., second cover sheet material 220 of FIG. 2 and second cover sheet material 320 of FIG. 3). The adhesive layer can penetrate into the cover sheet material of the gypsum board. The thickness of the adhesive layer is measured from the back face of the gypsum board and does not include adhesive that has penetrated the cover sheet material.

The adhesive layer of the layered wallboards should have a balance between tackiness and relaxation time. That is, the adhesive should be pliable and tacky enough to adhere to both the gypsum of the intermediate gypsum layer and the cover sheet material of the gypsum board. Concurrently, sound dampening is improved with a high viscoelastic relaxation time. That is, the velocity of sound depends on the elastic modulus of the adhesive ($\breve{E}(\omega)$). $\breve{E}(\omega)$ can be expressed as $\breve{E}(\omega)=E'(\omega)+iE''(\omega)$, where $E'(\omega)$ is the storage modulus and $E''(\omega)$ is the loss modulus of the adhesive and each can be expressed as EQ. 3 and EQ. 4, where w is frequency (for STC ω ranges from 100-5000 Hz) and θ is the viscoelastic relaxation time of the adhesive.

$$E'(\omega) = \frac{E}{1+(\omega\theta)^2} \qquad \text{EQ. 3}$$

$$E''(\omega) = E * \frac{\omega\theta}{1+(\omega\theta)^2} \qquad \text{EQ. 4}$$

Accordingly, $$\frac{E''(\omega)}{E'(\omega)} = \omega\theta.$$

Therefore, for a high θ, the loss modulus is higher as compared to the storage modulus. So, when E"(ω) is greater than E'(ω), the acoustic attenuation in transmission increases. In addition, the adhesive preferably should maintain high viscoelastic relaxation time over time and a range of temperatures.

The polymer of the adhesive layer is synthetic latex (i.e., an aqueous dispersion of polymer particles prepared by emulsion polymerization of one or more monomers). The latex is a film-forming polymer. The adhesive coating used to form the adhesive layer comprises an aqueous emulsion or dispersion comprising water, surfactant, and latex polymer selected from the group consisting of acrylics, styrene acrylics, acrylic esters, vinyl acrylics, vinyl chloride acrylic, styrene acetate acrylics, butyl acrylics, ethyl acrylics, ethylene polyvinyl acetate, polyvinyl acetate, styrene butadiene, and combinations thereof. If desired, the adhesive coating can have an absence of one or more of the foregoing polymers. Typical acrylics are polymers made from polymers of acrylic acid or acrylates, for example, polyacrylate, poly butyl acrylate, poly ethyl acrylate.

Preferably the latex polymer is selected from styrene-butadiene latex, styrene acrylic polymer, or acrylic ester polymer. Preferably, the latex polymer glass transition temperature is in the range from about −10° C. to about 30° C., more preferably from about 5° C. to about 30° C., more preferably from about −10° C. to about 20° C., and more preferably from about 10° C. to about 20° C.

Typically the adhesive compositions of the invention has at least 10 wt. %, more typically at least 20 wt. % latex polymer. For example, typically 15 to 70 wt. %, 45 to 70 wt. % or 45 to 60 wt. % latex polymer.

The adhesive compositions of the invention may also include a plasticizer.

Typically the adhesive compositions of the invention has 0 to 50 wt. % more typically 5 to 50 wt. %, furthermore typically 10 to 30 wt. % plasticizer. However, the adhesive compositions of the invention may have an absence of plasticizer.

Typical plasticizers may be any of abietates, phthalates, terephthalates, benzoates, and epoxidized oils such as epoxidized soybean oil (ESO), preferably the abietates.

The plasticizer improves both tack and sound attenuation. The term "tack" refers to the ability of a material to stick to the surface on momentary contact and then to resist separation.

Typical abietates are alkyl abietate, e.g., methyl abietate or ethyl abietate, or aralkyl abietate, for example benzyl abietate. The abietate is believed to work like a plasticizer and can be used to adjust the softness and tackiness of the adhesive.

The alkyl portion of the alkyl abietate can be a saturated linear or branched $C_1$ to $C_{16}$, preferably $C_1$ to $C_8$, alkyl group. The aralkyl group is typically benzyl.

Typical abietate plasticizers for use in the present invention are shown in Formula (I).

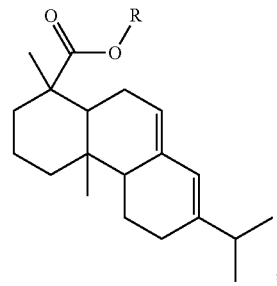

(I)

wherein R is a saturated linear or branched $C_1$ to $C_{18}$, typically $C_1$ to $C_{16}$ or $C_1$ to $C_8$ or $C_1$ to $C_4$, alkyl group or an aralkyl group, preferably benzyl.

A representative of the alkyl abietate family, methyl abietate, is shown in Formula (II).

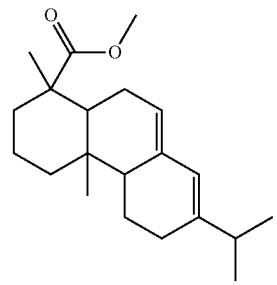

(II)

Another representative of the alkyl abietate family, hexadecyl ester of abietic acid (i.e., cetyl abietate), is shown in Formula (III).

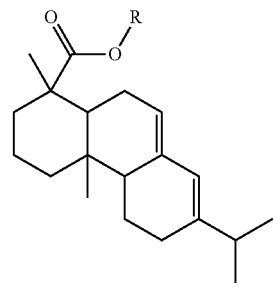

(III)

wherein R is a linear alkyl group having the formula $C_{16}H_{33}$.

The adhesive compositions of the invention may also include a resin. Typical resins may be any one or more synthetic resins. Typical resins may include any one or more plant resins. For example, typically one or more plant resins such as wood or gum rosin, ester gum, hydrogenated rosin, dammar gum, manila gum, coumarone-indene resin, copal, kauri gum, ethyl cellulose, mastic, and/or sandarac.

Typically, the adhesive compositions of the invention has 0 to 25 wt. %, more typically 5 to 20 wt. % resin. However, the adhesive compositions of the invention may have an absence of resin.

The adhesive compositions of the invention may also include a polyvinyl alcohol.

Typically, the adhesive compositions of the invention has 0 to 20 wt. %, more typically 5 to 15 wt. % polyvinyl alcohol. However, the adhesive compositions of the invention may have an absence of polyvinyl alcohol.

A preferred adhesive composition to achieve a balance of properties comprises the above-described polymer and a plasticizer, preferably an alkyl or aralkyl abietate plasticizer.

A more preferred adhesive composition for the present invention comprises a mixture of acrylic polymer, resin, polyvinyl alcohol and alkyl abietate. The acrylic component, resin, and polyvinyl alcohol can provide tack. Further, the hydrogel nature of polyvinyl alcohol also allows it to retain some water in it, which helps with workability and reduction sound transmission of the adhesive.

To improve the workability, different inorganic components (e.g., calcium carbonate, anhydrous gypsum, etc.) can be also included.

If desired particles of sound compliant material and particles of sound-stiff material can also be included in the polymer adhesive layer. Such a polymer adhesive layer would comprise the polymer adhesive as binder and a combination of first particles (the particles of sound compliant material) which are mostly compliant with respect to sound transmission and second particles (the particles of sound-stiff material) which are mostly stiff with respect to sound transmission.

It will be appreciated that the term "compliant material" is used interchangeably with the term "sound-compliant material" and it is understood broadly in this disclosure to mean a material which is at least partially flexible and able to transfer, dissipate and/or absorb sound waves through its body at least partially. It will be further appreciated that the term "stiff material" is used interchangeably with the term "sound-stiff material" and is understood broadly in this disclosure to mean any material which is likely to reflect most of energy from sound waves rather than transfer, dissipate and/or absorb the sound waves.

If desired, the sound-compliant particles are larger in size than sound-stiff particles such that each sound-compliant particle is surrounded with several sound-stiff particles. In other embodiments, sound-compliant particles and sound-stiff particles are of about same size. If desired, the sound-compliant particles and sound-stiff particles are used in the equal molar ratios. However, if desired the sound-compliant particles are the main component and sound-stiff particles are used in only much smaller amounts. In other embodiments, this ratio is reversed. For example, the molar ratio of sound-compliant particles to sound-stiff particles in the compliant coating may be from 1:1 to 1:1,000 or the molar ratio of sound-compliant particles to sound-stiff particles is 1,000:1 to 1:1.

If desired, the polymer adhesive layer comprises sound-compliant rubber particles, such as for example tire scrap particles, with sound-stiff nanometric silica particles. It will be further appreciated that any sound-compliant particles can be used, including, but not limited to, nitrile rubber, butyl rubber, ethylene propylene diene monomer (EPDM), natural rubber compounds, cotton fibers, organic fibers, inorganic fibers, polypropylene fibers, air-filled glass beads, polystyrene beads or polystyrene foam.

It will be also appreciated that any sound-stiff particles can be used in the compliant coating. Such sound-stiff particles may include, but are not limited to, silica particles, clay particles, calcium carbonate, perlite, gas-filled microspheres, hollow microspheres, cenospheres and inorganic glues. If desired, a combination of several sound-compliant materials can be mixed together with at least one sound-stiff material. If desired, a combination of several sound-stiff materials can be mixed together with at least one sound-compliant material. If desired, a combination of several sound-stiff materials can be mixed together with several sound-compliant materials.

However, without being limited by theory, sound has a higher transmission velocity through solid particulates. Therefore, to create the sharp discontinuity in velocity of sound at the different layers, the adhesive layer preferably does not include solid particulates. Generally, the polymer adhesive layer has an absence of mineral filler. Generally, the polymer adhesive layer has an absence of gypsum. Generally, the polymer adhesive coating applied has an absence of gypsum. Generally, the polymer adhesive coating applied has an absence of calcium carbonate. Generally, the polymer adhesive coating applied has an absence of magnesium carbonate. Generally, the polymer adhesive coating applied has an absence of pigment. Generally, the polymer adhesive coating applied has an absence of polyurea. Generally, the polymer adhesive coating applied has an absence of inorganic particles. Generally, the polymer adhesive coating applied has an absence of organic particles.

Generally, the polymer adhesive coating applied has an absence of hydroxyethyl cellulose.

Generally, the adhesive layer is applied in an amount equal to that to form a polymer coating having a thickness of about 0.02 inches to about 0.06 inches, a thickness of about 0.02 inches to about 0.05 inches.

The adhesive layer is applied on the board manufacturing line by at least one method selected from the group consisting of spray coating, dip coating, rill application, free jet application, blade metering, rod metering, metered film press coating, air knife coating, curtain coating, flexography printing, and roll coating.

Methods for preparing synthetic latexes are well known in the art and any of these procedures can be used. Latexes typically have 1-55 wt. % binder (polymer) and water. Latex is an emulsion with emulsified polymer particles that can vary from 30 nm to 1500 nm. Therefore, the adhesive coating can comprise the emulsified polymer particles with an absence of other particles including solid particles, for example filler particles. Once the adhesive coating is applied and is the adhesive layer in the final inventive product, the latex forms a film (e.g., a continuous film) and is not in particulate form. Therefore, the adhesive layer can have an absence of particulates.

Intermediate Gypsum Layers

The intermediate gypsum layer as described further below, is applied via coating, typically roll coating, a gypsum slurry onto the adhesive layer. Examples of gypsum slurries suitable for forming the intermediate gypsum layer are the formulations in Table 2. The additives and dispersants include those described above. In Table 2 any value in a column for a particular parameter may be combined with values for the other parameters from the same column or different columns. However, preferably any value in a column for a particular parameter is combined with the values for the other parameters from the same column.

TABLE 2

Gypsum Slurry for Producing the Intermediate Gypsum Layer

| Gypsum layer slurry | Broad Range | Preferred Range | Most Preferred Range | Specific Example |
|---|---|---|---|---|
| Calcined calcium sulfate (calcium sulfate hemihydrate and optionally calcium sulfate anhydrite, but at least 60 wt. % calcium sulfate hemihydrate in the calcined calcium sulfate) (wt. % on a dry basis)* | 70 to 98 | 79 to 98 | 85 to 98 | 89 to 97 |
| Additives (wt. % on a dry basis) | 0.01 to 28 | 0.1 to 20 | 1 to 15 | 2 to 10 |
| Dispersant (wt. % on a dry basis) | 0.01 to 2 | 0.05 to 2 | 0.1 to 1.5 | 0.5 to 1 |
| Weight ratio of the water to calcium sulfate hemihydrate in slurry | 1:6 to 1:1 | 0.2:1 to 0.8:1 | 0.4:1 to 0.7:1 | 2:3 |

*Dry basis means water free basis in the present specification.

The final or set intermediate gypsum layer comprises the concentrations of components in Table 2 except that the calcined calcium sulfate has converted to calcium sulfate dihydrate.

Optionally, the intermediate gypsum layer is foamed. In such instances, the slurry formulation can be foamed to have 10 to 70 volume % air, preferably 20 to 60 volume % air. The resultant intermediate gypsum layer has 30 to 92 volume % voids, preferably 30 to 90 volume % voids.

Producing Layered Wallboards

Methods of the present invention include producing the layered wallboards described herein. A first method of the invention includes applying the adhesive layer and then the gypsum layer and third cover sheet material to an already produced gypsum board.

The adhesive layer can be applied to the already produced gypsum board by at least one method selected from the group consisting of spray coating, dip coating, rill application, free jet application, blade metering, rod metering, metered film press coating, air knife coating, curtain coating, flexography printing, and roll coating.

The intermediate gypsum layer can be applied by spray coating, dip coating, rill application, free jet application, blade metering, rod metering, metered film press coating, air knife coating, curtain coating, flexography printing, and roll coating with the third cover sheet material then applied by conventional methods used in producing gypsum boards having gypsum layer between two cover sheet materials.

The calcined gypsum reacts with the water in the gypsum layer and sets to produce the layered wallboard. Optionally, a kiln or other heating device can be used to dry and set the gypsum layer. The resultant layered wallboard can be processed further as needed for the desired application. For example, the layered wallboard can be scored and/or cut to a different size.

A second method of the invention includes applying the adhesive layer, the gypsum layer, and the third cover sheet material during production of the gypsum board. For example, FIG. 4 illustrates an example production line for producing a layered wallboard of the present invention with a gypsum board having gypsum layer between two cover sheet materials.

Figure 4:
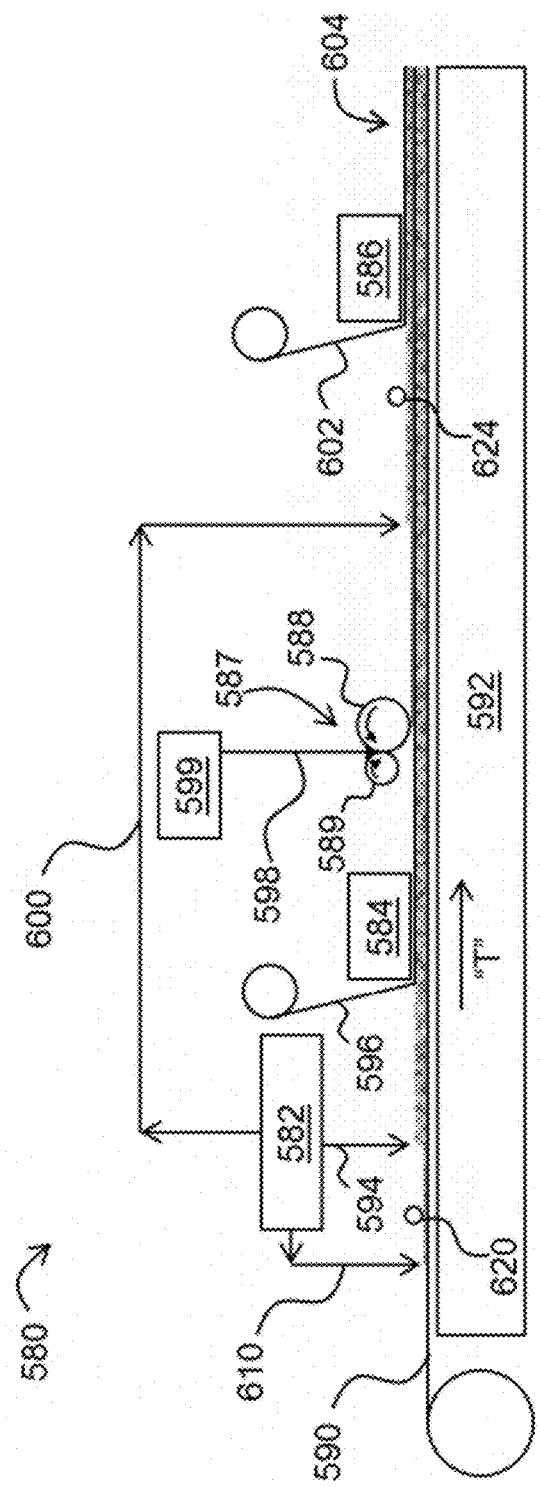
FIG. 4 illustrates an example production line for producing a layered wallboard of the present invention.

FIG. 4 shows an exemplary embodiment of a wet end 580 of a manufacturing line. The wet end 580 includes a gypsum slurry mixing and dispensing assembly 582, first and second forming stations 584, 586, and an adhesive coat roller 588. A first moving web 590 (e.g., first cover sheet material 218 of FIG. 2 or first cover sheet material 318 of FIG. 3) moves in a longitudinal direction of travel "T" along the forming table 592. The gypsum core slurry 594 is mixed in the gypsum slurry mixing and dispensing assembly 582 where additives and optional foaming of the slurry occurs. While the gypsum slurry mixing and dispensing assembly 582 is illustrated as a single component of the wet end 580, there can be multiple components that comprise the gypsum slurry mixing and dispensing assembly 582.

The skim gypsum coat roller 620, the intermediate gypsum coat roller 624, the forming table 592, the forming station 584, and the forming station 586 can all comprise conventional equipment suitable for their intended purposes as is known in the art. The wet end 580 can be equipped with other conventional equipment as is known in the art.

If included, the gypsum skim layer slurry 610 may be applied to the first cover sheet material 590 to form a gypsum skim layer (e.g., gypsum skim layer 322 of FIG. 3) on the first cover sheet material 590 before depositing the core gypsum core slurry 594. The gypsum core slurry 594 for the gypsum core layer of the board is deposited onto either the first moving web 590 (e.g., to form gypsum core 216 of FIG. 2) or the gypsum skim layer slurry 610, if applied, (e.g., to form foamed gypsum core 316 of FIG. 3). A second moving web 596 (e.g., second cover sheet material 220 of FIG. 2 or second cover sheet material 320 of FIG. 3) is applied to the gypsum core slurry 594 and optionally passed through the first forming station 584 to compress the gypsum core slurry 594 and webs 590, 596 into a desired thickness (e.g., about 0.25 inches to about 1.5 inches thick, preferably 0.5 inches to about 1 inch thick, and more preferably about 0.5 inches to about 0.75 inches thick).

Then, in the illustrated example, the adhesive coating 598 from a source of adhesive 599 is applied with an adhesive roller coater assembly 587 to the second moving web 596, which will be the adhesive layer (e.g., adhesive layer 208 of FIG. 2 or adhesive layer 308 of FIG. 3) of the final layered wallboard. The roller coater assembly 587 includes a doctor roller 589 which engages a finish roller 588. One or both of the rollers 588 and 589 are driven by a motor (not shown). Other means of applying the adhesive coating, for example, a sprayer, could be employed instead of a roll coater. Additionally, the forming station 584 can be removed and the adhesive coating can be applied to the second cover sheet material 596 before the second cover sheet material 596 is applied to the gypsum core slurry 594.

A calcined gypsum slurry 600 for forming the intermediate gypsum layer (e.g., intermediate gypsum layer 210 of FIG. 2 or intermediate gypsum layer 310 of FIG. 3) is then applied to the adhesive coating 598. The calcined gypsum (calcium sulfate hemihydrate) slurry 600 for forming the gypsum layer can be the same or different than the core gypsum core slurry 594 for forming the gypsum board. While the illustration shows both gypsum slurries 594, 600 coming from the same calcined gypsum slurry mixing and dispensing assembly 582, the calcined gypsum slurries 594, 600 can come from different mixing and dispensing assemblies to have different properties, such as different densities. Typically the calcined gypsum slurry for the gypsum (calcium sulfate dihydrate) core layer is foamed to be less dense than the slurry for the intermediate gypsum layer, as well as less dense than the skim layer. Thus if desired, calcined gypsum core slurry stream 594 may pass through a former device (not shown), which for instance mixes the calcined gypsum core slurry stream 594 with foam and/or air, prior to deposition on the first cover sheet material 590.

Additional components can be included in the wet end 580 of the manufacturing line. For example, a skim coating of non-foamed calcined gypsum slurry can be applied between the second moving web 596 and the gypsum core slurry 594. The gypsum skim layer will typically be thinner and denser than the gypsum core layer. Typically the slurry streams for the gypsum skim layer and the intermediate gypsum layer have the same composition and density. As a result, the gypsum skim layer and the intermediate gypsum layer have the same composition and density. However if desired, the slurry streams for the gypsum skim layer and the intermediate gypsum layer can have different compositions and/or densities. Likewise if desired, the gypsum skim layer and the intermediate gypsum layer can have different compositions and/or densities.

A third moving web 602 (e.g., third cover sheet material 212 of FIG. 2 or third cover sheet material 312 of FIG. 3) is applied to the gypsum slurry 600 and passed through the second forming station 586 to compress the layers into a desired total thickness (e.g., about 0.375 inches to about 1.625 inches thick, preferably 0.625 inches to about 1.125 inches thick, and more preferably about 0.625 inches to about 0.875 inches thick). The resultant structure is a layered wallboard preform 604.

Typically the outer surface of the applied moving web 602 is in contact with no additional layers.

The calcined gypsum in the gypsum slurries 594, 600 reacts with the water and sets as a conveyor moves the layered wallboard preform 604 down a manufacturing line. The layered wallboard preform 604 is cut into segments of predetermined dimensions at a point along the line where the layered wallboard preform 604 has set sufficiently. The segments can be flipped over, dried (e.g., in a kiln) to drive off excess water, and processed to provide the final layered wallboard of desired dimensions.

The gypsum core layer (e.g., gypsum core 216 of FIG. 2 or foamed gypsum core 316 of FIG. 3) resulting from the set gypsum core slurry 594 generally has a thickness of 0.25 inches to 1.5 inches and a density of 15 to 55 pounds/cubic foot. When foamed, the gypsum core layer resulting from the set foamed gypsum slurry has a total void volume of 30 to 90 volume percent, preferably a void volume of 45 to 80 volume percent.

The gypsum slurry 600 for the intermediate gypsum layer, as well as the gypsum slurry 610 for the skim coating (if present), can be relatively dense gypsum slurries having a density greater than that of a foamed gypsum slurry for the gypsum core layer. These layers of relatively dense gypsum slurry are thinner than the foamed gypsum core layer. When a dense slurry is used, the intermediate layer has a total void volume of less than 30 volume percent, preferably less than 10 volume %. The skim layer (if present) resulting from setting the relatively dense gypsum slurry 610 has a total void volume of less than 30 volume percent, preferably less than 10 volume %.

Alternatively, the gypsum slurry 600 for the intermediate gypsum layer can be foamed, which results in an intermediate gypsum layer having a total void volume of 30 to 90 volume percent, preferably a void volume of 45 to 80 volume percent.

EXAMPLES

In the examples herein, as mentioned above, percentages of compositions or product formulae are in weight percentages, unless otherwise expressly stated. The reported measurements also in approximate amounts unless expressly stated, for example, approximate percentages, weights, temperatures, distances or other properties.

Example 1

The vibration transmission through three wallboard samples were measured and analyzed. While the test is not specifically sound, the test does measure wave propagation through the wallboard samples and provides an indication of potential sound dampening qualities.

The Control Wallboard sample was a commercially available ⅝ inch wallboard. A Laminated Wallboard sample is a commercially available laminated wallboard comprising two 5/16 inch wallboards adhered together. A Layered Wallboard sample of the present invention was prepared by applying an adhesive layer, an intermediate gypsum layer, and paper surface layer to a commercially available ½ inch wallboard having a foamed gypsum core, wherein the combined thickness of the adhesive layer and intermediate gypsum layer was ⅛ inch giving a final thickness of ⅝ inch.

Figure 5:
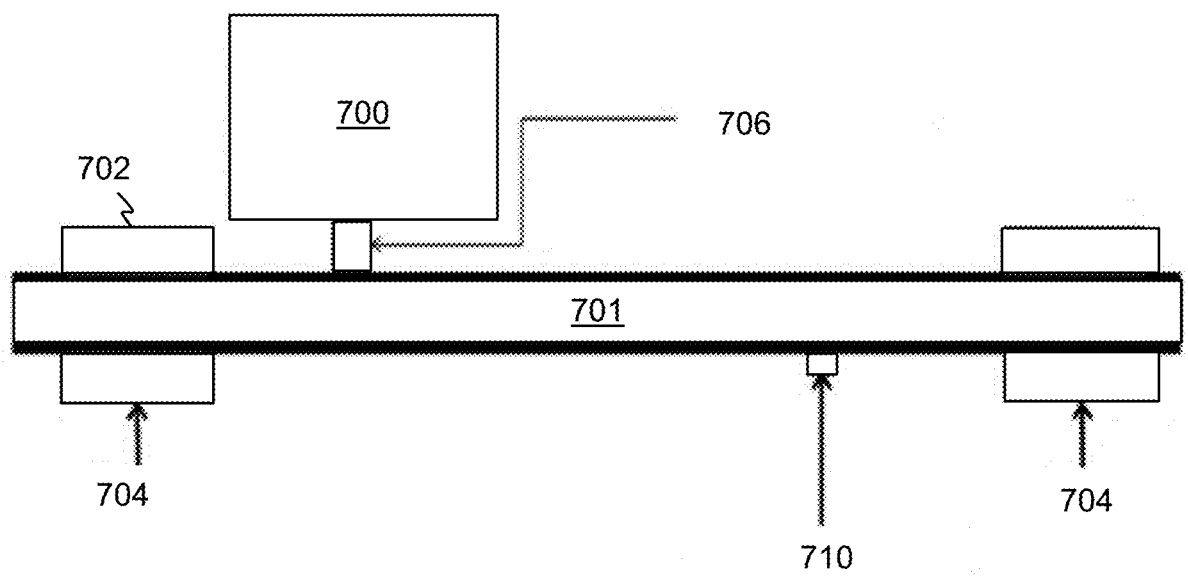
FIG. 5 is a diagram of a configuration for measuring vibration wave penetration through wallboards.

FIG. 5 is a diagram of a configuration for measuring vibration wave penetration through wallboards. A gypsum wallboard sample 701 was held by silicone rubber padded clamps 704 to mitigate undesirable vibrations. An electrodynamic shaker 700 was placed upon vibration isolation pads 702 and securely fastened to the table by clamps 704. An impedance head 706 was attached to the shaker 700 to measure the input force, which was used to normalize the frequency response function. The shaker 700 was excited with a random noise signal ranging from 100 to 4000 Hz. Micro-accelerometers 710 were used to measure the frequency response function at the equidistant points along the wallboard beam.

Figure 6:
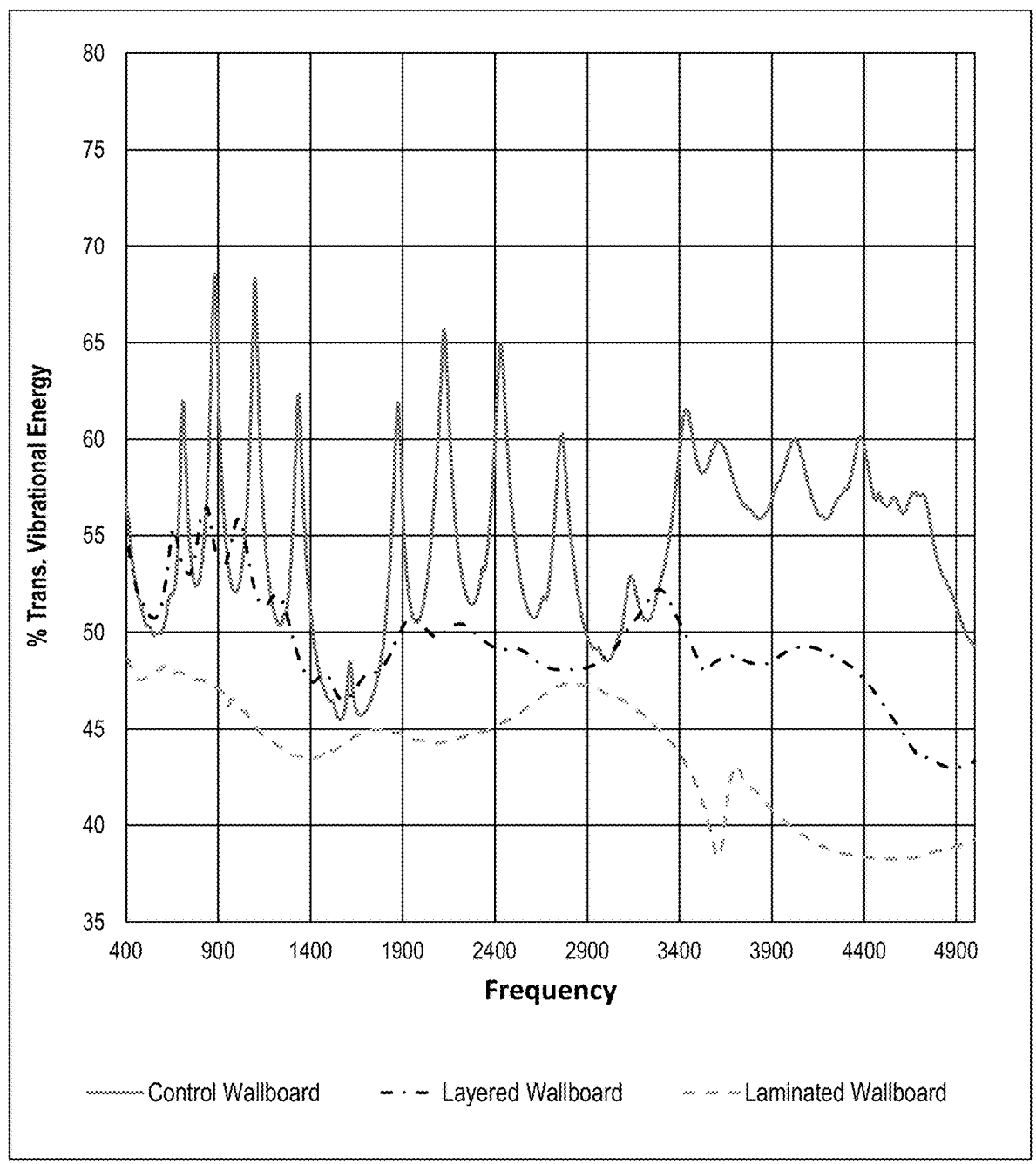
FIG. 6 is a plot of vibration measurements for several wallboard configurations.

FIG. 6 is a plot of vibration transmission measurements for the three wallboard samples. The Laminated Wallboard provides the best vibration dampening. However, the Layered Wallboard is much improved over the Control Wallboard.

Example 2

An adhesive comprising about 60 wt. % acrylic-vinyl chloride polymer, about 10 wt. % natural resin, about 10 wt. % polyvinyl alcohol, and about 20 wt. % methyl abietate was prepared.

Figure 7:
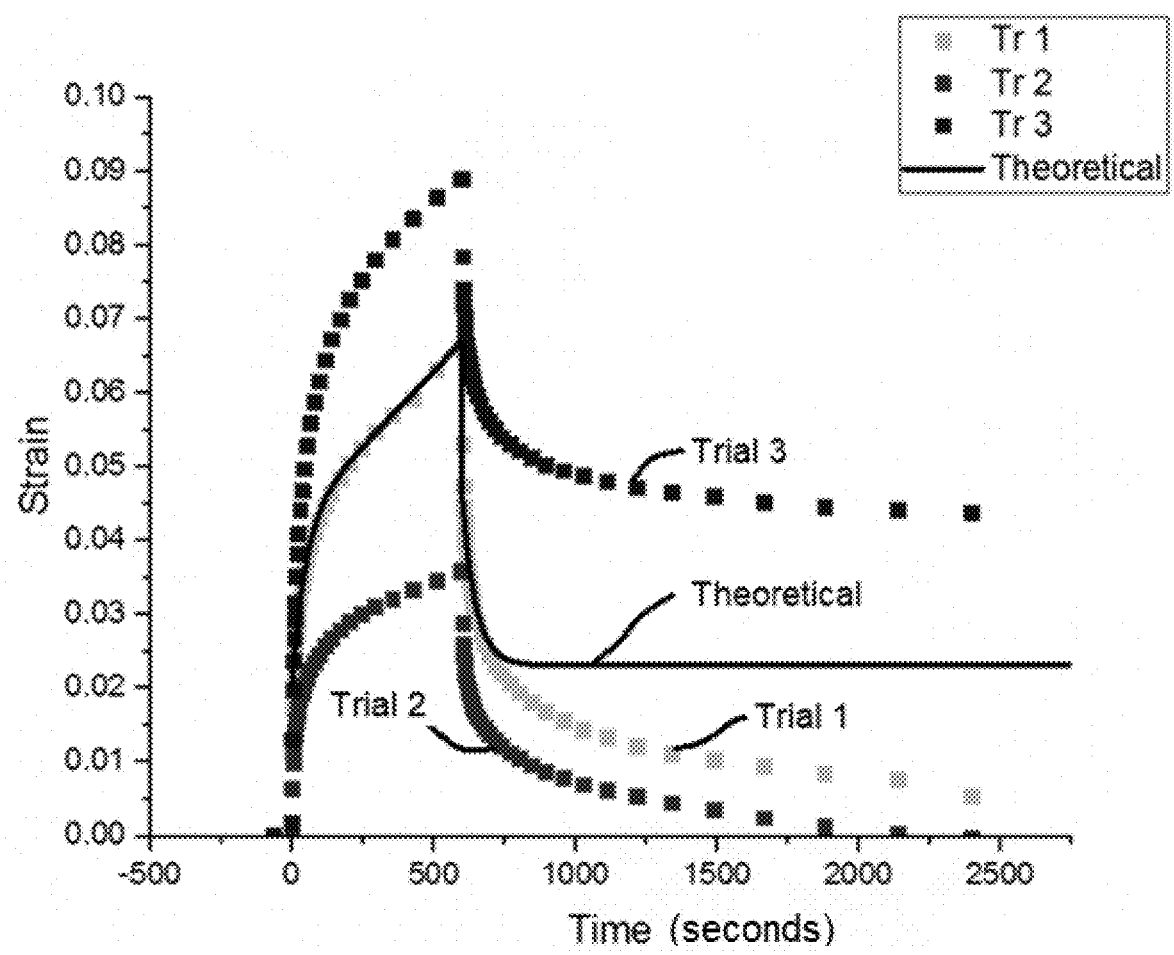
FIG. 7 is a plot of a creep relaxation of the adhesive of an example.

FIG. 7 is a strain (dimensionless) vs. time (seconds) plot of three trials of creep relaxation (ASTM C480/C480M-16) of this adhesive comprising acrylic-vinyl chloride polymer, methyl abietate, polyvinyl alcohol, and natural resin. Also plotted is the theoretical creep relaxation for this adhesive composition. From the creep relaxation study the value of 8 for one of the composition for dried glue was found to be equal to 22.2 second (cf. FIG. 7). This shows that for the frequency domain, the proposed glue will result in significant attenuation.

Example 3

To test performance conventional boards were compared to a layered wall board of the invention in the following systems comprising framing comprising 25 gauge eq. steel stud 24 inches on center (o.c.) with R-13 3½" glass wool batt insulation. The tests were conducted according to ASTM E-90-09 (2016) (Standard Test Method for Laboratory Measurement of Airborne Sound Transmission Loss of Building Partitions and Elements).

As a base line study two conventional systems were studied. The first system had a single ⅝" gypsum board on both the sound source side and sound receive side (STC=48). The second system had a conventional single ⅝" laminated board obtained from the market on the source side and a single ⅝" gypsum board on the receive side (STC=53). The laminated board was two ⁵⁄₁₆" boards glued together. The test protocol has a sound source on the sound source side and has a receiver microphone on the sound receive side.

The conventional laminated board weight was ~2600-2700 lb/msf (1 msf=1000 square foot).

Also, a layered gypsum wallboard of the present invention was prepared. It was significantly lighter ~2100 lb/msf.

The layered gypsum wallboard of the invention was prepared with the adhesive according to FIG. 2. The overall thickness was about 0.625 inches. Of this overall thickness the gypsum board was about 0.525 inches thick (including its gypsum core and front facing paper sheet and back paper sheet), the gypsum coating was about 0.08 inches thick and the remainder was an adhesive layer between the gypsum coating and the gypsum board. The adhesive was that of EXAMPLE 2 comprising polyacrylate, methyl abietate, polyvinyl alcohol, and resin Then, two additional systems employing this layered gypsum wallboard of the present invention (Inventive STC board) were tested. The first inventive system had a single Inventive STC board on both the sound source side and sound receive side. The second inventive system had an Inventive STC board on the source side and a single ⅝" gypsum board on the receive side. These systems had the following arrangements:

(a) Source and receive→inventive STC board (STC-54); and (b) Source→inventive STC board Receive→⅝" gypsum board (STC-52).

In both systems the boards were mounted on the above-described framing comprising 25 gauge eq. steel stud 24" on center (o.c.) with R-13 3½" Knauf ECOBATT insulation between the studs.

The data shows that although, the proposed STC board was almost 20% lighter than the laminated board, it performs almost equal to the laminated board.

CLAUSES OF THE INVENTION

The following clauses present various aspects of the present invention.

Clause 1. A layered wallboard comprising:

a gypsum board having opposing front and back faces, wherein the gypsum board comprises a first cover sheet material at the front face, a second cover sheet material at the back face, and a gypsum core layer comprising gypsum, wherein the gypsum board has a thickness of 0.25 inches to 1.5 inches;

an adhesive layer on the second cover sheet material of the gypsum board, said adhesive comprising a polymer having a glass transition temperature ($T_g$) of −10° C. to 30° C.;

an intermediate gypsum layer comprising gypsum on the adhesive layer such that the adhesive layer is between the second cover sheet material and the intermediate gypsum layer, wherein the adhesive layer and the intermediate gypsum layer have a combined thickness of 0.09 inches to 0.25 inches; and a third cover sheet material, wherein the intermediate gypsum layer is between and in contact with the adhesive layer and the third cover sheet material.

Clause 2. The layered wallboard of clause 1, wherein the polymer of the adhesive layer comprises a latex polymer selected from the group consisting of acrylics, styrene acrylics, acrylic esters, vinyl acrylics, vinyl chloride acrylic, styrene acetate acrylics, butyl acrylics, ethyl acrylics, ethylene polyvinyl acetate, polyvinyl acetate, styrene butadiene, and combinations thereof.

Clause 3. The layered wallboard of clause 1 or 2, wherein the adhesive layer further comprises a plasticizer.

Clause 4. The layered wallboard of clause 1 or 2, wherein the adhesive layer further comprises an abietate.

Clause 5. The layered wallboard of any of clauses 1 or 2, wherein the adhesive layer further comprises alkyl abietate and a plant resin and polyvinyl alcohol.

Clause 6. The layered wallboard of clause 1, wherein the polymer of the adhesive layer comprises an acrylic latex polymer having a glass transition temperature ($T_g$) of −10° C. to about 20° C., preferably a glass transition temperature (Tg) of 10° C. to 20° C.

Clause 7. The layered wallboard of any preceding clause, wherein the adhesive layer has a thickness of about 0.02 inches to about 0.06 inches.

Clause 8. The layered wallboard of any preceding clause, wherein the layered wallboard has a sound transmission class of 50 to 70.

Clause 9. The layered wallboard of any preceding clause, wherein the gypsum board further comprises a skim layer between and in contact with the first cover sheet material and the gypsum core layer, and wherein the gypsum core layer is a foamed gypsum core layer having a total void volume of 30 to 90 volume percent.

Clause 10. The layered wallboard of any one of clauses 1-8, wherein the gypsum core layer of the gypsum board is between and in contact with the first cover sheet material and the second cover sheet material, and wherein the gypsum core layer has a total void volume of less than 30 volume percent.

Clause 11. The layered wallboard of any preceding clause, wherein the intermediate gypsum layer is a foamed intermediate gypsum layer and has a total void volume of 30 to 90 volume percent.

Clause 12. The layered wallboard of any one of clauses 1-10, wherein the intermediate gypsum layer has a total void volume of less than 30 volume percent.

Clause 13. The layered wallboard of any preceding clause, wherein the adhesive layer has an absence of gypsum, wherein the adhesive layer has an absence of calcium carbonate, wherein the adhesive layer has an absence of magnesium carbonate, wherein the adhesive layer has an absence of pigment, wherein the adhesive layer has an absence of polyurea, wherein the adhesive layer has an absence of organic particles, and wherein the adhesive layer has an absence of inorganic particles.

Clause 14. The layered wallboard of any preceding clause, an outer surface of the third cover sheet material is in contact with no additional layers.

Clause 15. The layered wallboard of any preceding clause, wherein the gypsum core layer and the intermediate gypsum layer comprise about 70 wt % to about 98 wt % calcium sulfate dihydrate, about 0.1 wt % to about 28 wt % additives, and about 0.01 wt % to about 2 wt % dispersant.

Clause 16. The layered wallboard of any preceding clause, wherein the entire back face of the gypsum board is coated with the adhesive layer.

Clause 17. The layered wallboard of any preceding clause, wherein an entire surface of the intermediate gypsum layer is in contact with the adhesive layer, and an entire opposing surface of the intermediate gypsum layer is in contact with the third cover sheet material.

Clause 18. A method comprising:
applying an adhesive coating having a thickness of 0.02 inches to 0.06 inches on a back face of a gypsum board having opposing front and back faces, said adhesive comprising a polymer having a glass transition temperature ($T_g$) of −10° C. to about 30° C., wherein the gypsum board comprises a first cover sheet material at the front face, a second cover sheet material at the back face, and a gypsum core layer comprising gypsum, wherein the gypsum board has a thickness of 0.25 inches to 1.5 inches;
applying an intermediate gypsum slurry comprising calcium sulfate hemihydrate on the adhesive coating to form an intermediate gypsum layer, wherein the adhesive coating and the gypsum slurry have a combined thickness of 0.09 inches to 0.25 inches; and
applying a third cover sheet material on the intermediate gypsum slurry; and
allowing the calcium sulfate hemihydrate of the gypsum slurry to set to form a layered wallboard.

Clause 19. The method of clause 18, wherein the polymer of the adhesive comprises a latex polymer selected from the group consisting of acrylics, styrene acrylics, acrylic esters, vinyl acrylics, vinyl chloride acrylic, styrene acetate acrylics, butyl acrylics, ethyl acrylics, ethylene polyvinyl acetate, polyvinyl acetate, styrene butadiene, and combinations thereof.

Clause 20. The method of clause 18 or 19, wherein the polymer of the adhesive comprises an acrylic latex polymer having a glass transition temperature ($T_g$) of −10° C. to about 20° C., preferably a glass transition temperature (Tg) of 10° C. to 20° C.

Clause 21. The method of any one of clauses 18-20, wherein the adhesive further comprises plasticizer.

Clause 22. The method of any one of clauses 18-21, wherein the layered wallboard has a sound transmission class of 50 to 70.

Clause 23. The method of any one of clauses 18-22, wherein the intermediate gypsum slurry is foamed and sets to form an intermediate gypsum layer having a total void volume of 30 to 90 volume percent.

Clause 24. The method of any one of clauses 18-22, wherein the intermediate gypsum slurry sets to form an intermediate gypsum layer having a total void volume of less than 30 volume percent.

Clause 25. A method comprising:
optionally applying a skim layer slurry to a first cover sheet material, the skim layer slurry comprising water and calcium sulfate hemihydrate;
applying a gypsum core slurry to either the first cover sheet material when the skim layer slurry is not present or the skim layer slurry when present, the gypsum core slurry comprising water and calcium sulfate hemihydrate;
applying a second cover sheet material to the gypsum core slurry, wherein a first side of the second cover sheet material faces toward the gypsum core slurry;
applying a polymer adhesive coating on a second side of the second cover sheet material opposed to the first side of the second cover sheet material, wherein the polymer adhesive comprises a polymer has a glass transition temperature ($T_g$) of −10° C. to about 30° C.;
applying an intermediate gypsum slurry onto the polymer adhesive coating, the intermediate gypsum slurry comprising water and calcium sulfate hemihydrate,
wherein the polymer adhesive coating and the second gypsum slurry have a combined thickness of 0.09 inches to 0.25 inches; and
applying a third cover sheet material on the intermediate gypsum slurry; and
allowing the skim layer slurry, the gypsum core slurry, and the intermediate gypsum slurry to set to form a layered wallboard wherein a gypsum core layer resulting from the set gypsum core slurry has a thickness of 0.25 to 1.5 inches.

Clause 26. The method of clause 25, wherein the polymer of the adhesive coating comprises a latex polymer selected from the group consisting of acrylics, styrene acrylics, acrylic esters, vinyl acrylics, vinyl chloride acrylic, styrene acetate acrylics, butyl acrylics, ethyl acrylics, ethylene polyvinyl acetate, polyvinyl acetate, styrene butadiene, and combinations thereof.

Clause 27. The method of clause 25 or 26, wherein the adhesive coating further comprises plasticizer.

Clause 28. The method of clause 25, 26 or 27, wherein the polymer of the adhesive coating comprises an acrylic latex polymer having a glass transition temperature ($T_g$) of −10° C. to about 20° C., preferably a glass transition temperature (Tg) of 10° C. to 20° C.

Clause 29. The method of one of clauses 25-28, wherein the layered wallboard has a sound transmission class of 50 to 70.

Clause 30. The method of one of clauses 25-29, wherein the intermediate gypsum slurry is foamed and sets to form an intermediate gypsum layer having a total void volume of 30 to 90 volume percent.

Clause 31. The method of one of clauses 25-29, wherein the intermediate gypsum slurry sets to form an intermediate gypsum layer having a total void volume of less than 30 volume percent.

Clause 32. The method of one of clauses 25-31, wherein the gypsum core slurry is foamed and the gypsum core layer has a total void volume of 30 to 90 volume percent.

Clause 33. The method of one of clauses 25-31, wherein the gypsum core layer has a total void volume of less than 30 volume percent.

Clause 34. The method of one of clauses 25-33, wherein the second cover sheet material covers an entire side of the gypsum core layer, wherein the entire second cover sheet material facing the adhesive coating is coated with the adhesive coating.

Clause 35. The method of one of clauses 25-34, wherein an entire surface of the intermediate gypsum slurry is in contact with the adhesive coating, and an entire opposing surface of the intermediate gypsum slurry is in contact with the third cover sheet material.

Clause 36. The method of one of clauses 25-35, wherein the first cover sheet material is paper, the second cover sheet material is paper, and the third cover sheet material is paper.

Clause 37. The method of one of clauses 25-36, wherein the skim layer is a first skim layer and the method further comprises:

applying a second skim layer comprising gypsum to the gypsum core slurry, wherein the first skim layer and second skim layer are on opposed sides of the gypsum core slurry; and applying the second cover sheet material directly to the second skim layer.

Clause 38. The method of one of clauses 25-36, wherein the second cover sheet material is applied directly to the gypsum core slurry.

The present invention is not limited by the above description but by the claims appended hereto.

What is claimed is:

1. A layered wallboard comprising:
   a gypsum board having opposing front and back faces, wherein the gypsum board comprises a first cover sheet material at the front face, a second cover sheet material at the back face, and a gypsum core layer comprising gypsum, wherein the gypsum board has a thickness of 0.25 inches to 1.5 inches, the first cover sheet and the second cover sheet adhering to the gypsum core layer;
   an adhesive layer directly on and adhering to the second cover sheet material of the gypsum board, said adhesive comprising a polymer having a glass transition temperature ($T_g$) of −10° C. to 30° C.;
   an intermediate gypsum layer comprising gypsum directly on and adhering to the adhesive layer such that the adhesive layer is between the second cover sheet material and the intermediate gypsum layer, wherein the adhesive layer and the intermediate gypsum layer have a combined thickness of 0.09 inches to 0.25 inches; and
   a third cover sheet material, wherein the intermediate gypsum layer is between and in contact with the adhesive layer and the third cover sheet material,
   wherein the first cover sheet material is paper for cover sheet or fiberglass for cover sheet,
   the second cover sheet material is paper for cover sheet or fiberglass for cover sheet and
   the third cover sheet material is paper for cover sheet or fiberglass for cover sheet, and
   wherein the first cover sheet material, the second cover sheet material and the third cover sheet material are the only layers of cover sheet of the layered wallboard.

2. The layered wallboard of claim 1, wherein the polymer of the adhesive layer comprises a latex polymer selected from the group consisting of acrylics, styrene acrylics, acrylic esters, vinyl acrylics, vinyl chloride acrylic, styrene acetate acrylics, butyl acrylics, ethyl acrylics, ethylene polyvinyl acetate, polyvinyl acetate, styrene butadiene, and combinations thereof.

3. The layered wallboard of any of claim 1, wherein the adhesive layer further comprises alkyl abietate and a plant resin and polyvinyl alcohol.

4. The layered wallboard of claim 1, wherein the adhesive layer has a thickness of about 0.02 inches to about 0.06 inches.

5. The layered wallboard of claim 1, wherein the intermediate gypsum layer is a foamed intermediate gypsum layer and has a total void volume of 30 to 90 volume percent.

6. The layered wallboard of claim 1, wherein the intermediate gypsum layer has a total void volume of less than 30 volume percent.

7. The layered wallboard claim 1, wherein the adhesive layer has an absence of gypsum, wherein the adhesive layer has an absence of calcium carbonate, wherein the adhesive layer has an absence of magnesium carbonate, wherein the adhesive layer has an absence of pigment, wherein the adhesive layer has an absence of polyurea, wherein the adhesive layer has an absence of organic particles, and wherein the adhesive layer has an absence of inorganic particles.

8. The layered wallboard of claim 1, wherein an outer surface of the third cover sheet material is in contact with no additional layers.

9. The layered wallboard of claim 1, wherein the gypsum core layer and the intermediate gypsum layer comprise about 70 wt % to about 98 wt % calcium sulfate dihydrate, about 0.1 wt % to about 28 wt % additives, and about 0.01 wt % to about 2 wt % dispersant.

10. The layered wallboard of claim 1, wherein the entire back face of the gypsum board is coated with the adhesive layer.

11. The layered wallboard of claim 1, wherein an entire surface of the intermediate gypsum layer is in contact with the adhesive layer, and an entire opposing surface of the intermediate gypsum layer is in contact with the third cover sheet material.

12. The layered wallboard of claim 1, wherein the polymer having the glass transition temperature ($T_g$) of −10° C. to 30° C. is acrylic polymer, wherein the adhesive layer consists of acrylic polymer, alkyl abietate and a plant resin and polyvinyl alcohol.

13. The layered wallboard of claim 1, wherein the adhesive layer comprises about 60 wt. % acrylic-vinyl chloride polymer, about 10 wt. % natural resin, about 10 wt. % polyvinyl alcohol, and about 20 wt. % methyl abietate.

14. The layered wallboard of claim 1, wherein each of the first, second and third cover sheets are paper cover sheet.

15. A method of making the layered wallboard of claim 1, wherein the method comprises:
   applying an adhesive coating having a thickness of 0.02 inches to 0.06 inches on a back face of a gypsum board having opposing front and back faces, said adhesive comprising a polymer having a glass transition temperature (Tg) of −10° C. to about 30° C., wherein the gypsum board comprises a first cover sheet material at the front face, a second cover sheet material at the back face, and a gypsum core layer comprising gypsum, wherein the gypsum board has a thickness of 0.25 inches to 1.5 inches,
   applying an intermediate gypsum slurry comprising calcium sulfate hemihydrate on the adhesive coating to form an intermediate gypsum layer, wherein the adhesive coating and the gypsum slurry have a combined thickness of 0.09 inches to 0.25 inches; and
   applying a third cover sheet material on the intermediate gypsum slurry,
   wherein the first cover sheet material is paper for cover sheet or fiberglass for cover sheet, the second cover sheet material is paper for cover sheet or fiberglass for cover sheet, and the third cover sheet material is paper for cover sheet or fiberglass for cover sheet, and wherein the first cover sheet material, the second cover sheet material and the third cover sheet material are the only layers of cover sheet of the layered wallboard; and allowing the calcium sulfate hemihydrate of the gypsum slurry to set to form a layered wallboard.

16. The method of claim 15, wherein the polymer of the adhesive comprises a latex polymer selected from the group consisting of acrylics, styrene acrylics, acrylic esters, vinyl acrylics, vinyl chloride acrylic, styrene acetate acrylics, butyl acrylics, ethyl acrylics, ethylene polyvinyl acetate, polyvinyl acetate, styrene butadiene, and combinations thereof.

17. The method of claim 15, wherein the intermediate gypsum slurry is foamed and sets to form an intermediate gypsum layer having a total void volume of 30 to 90 volume percent.

18. A method of making the layered wallboard of claim 1, wherein the method comprises:

optionally applying a skim layer slurry to a first cover sheet material, the skim layer slurry comprising water and calcium sulfate hemihydrate;

applying a gypsum core slurry to either the first cover sheet material when the skim layer slurry is not present or the skim layer slurry when present, the gypsum core slurry comprising water and calcium sulfate hemihydrate;

applying a second cover sheet material to the gypsum core slurry, wherein a first side of the second cover sheet material faces toward the gypsum core slurry;

applying a polymer adhesive coating on a second side of the second cover sheet material opposed to the first side of the second cover sheet material, wherein the polymer adhesive comprises a polymer has a glass transition temperature ($T_g$) of $-10°$ C. to about $30°$ C.;

applying an intermediate gypsum slurry onto the polymer adhesive coating, the intermediate gypsum slurry comprising water and calcium sulfate hemihydrate, wherein the polymer adhesive coating and the second gypsum slurry have a combined thickness of 0.09 inches to 0.25 inches; and applying a third cover sheet material on the intermediate gypsum slurry, wherein the first cover sheet material is paper for cover sheet or fiberglass for cover sheet, the second cover sheet material is paper for cover sheet or fiberglass for cover sheet, and the third cover sheet material is paper for cover sheet or fiberglass for cover sheet, and wherein the first cover sheet material, the second cover sheet material and the third cover sheet material are the only layers of cover sheet of the layered wallboard, and allowing the skim layer slurry, the gypsum core slurry, and the intermediate gypsum slurry to set to form a layered wallboard wherein a gypsum core layer resulting from the set gypsum core slurry has a thickness of 0.25 to 1.5 inches.

19. The method of claim 18, wherein the polymer of the adhesive coating comprises a latex polymer selected from the group consisting of acrylics, styrene acrylics, acrylic esters, vinyl acrylics, vinyl chloride acrylic, styrene acetate acrylics, butyl acrylics, ethyl acrylics, ethylene polyvinyl acetate, polyvinyl acetate, styrene butadiene, and combinations thereof.

20. The method of claim 18, wherein the intermediate gypsum slurry is foamed and sets to form an intermediate gypsum layer having a total void volume of 30 to 90 volume percent.

* * * * *